United States Patent
Sawado

(10) Patent No.: US 8,421,969 B2
(45) Date of Patent: Apr. 16, 2013

(54) ELECTROOPTIC DEVICE AND ELECTRONIC APPARATUS

(75) Inventor: Ayae Sawado, Kai (JP)

(73) Assignee: Seiko Epson Corporation, Tokyo (JP)

( * ) Notice: Subject to any disclaimer, the term of this patent is extended or adjusted under 35 U.S.C. 154(b) by 100 days.

(21) Appl. No.: 13/078,038

(22) Filed: Apr. 1, 2011

(65) Prior Publication Data

US 2011/0242472 A1    Oct. 6, 2011

(30) Foreign Application Priority Data

Apr. 2, 2010    (JP) ................................. 2010-085844

(51) Int. Cl.
*G02F 1/1335*    (2006.01)

(52) U.S. Cl.
USPC ........................... 349/114; 349/113; 349/190

(58) Field of Classification Search .......... 349/123–129, 349/153, 190, 113–114
See application file for complete search history.

(56) References Cited

U.S. PATENT DOCUMENTS

| 6,493,052 B1 | 12/2002 | Satake et al. |
| 6,989,879 B1 * | 1/2006 | Nakahara et al. ............. 349/123 |
| 7,679,702 B2 | 3/2010 | Oura et al. |

FOREIGN PATENT DOCUMENTS

| JP | 11-344726 A | 12/1999 |
| JP | 2008-158395 A | 7/2008 |
| JP | 2010-020209 A | 1/2010 |

* cited by examiner

*Primary Examiner* — Phu Vu
(74) *Attorney, Agent, or Firm* — ALG Intellectual Property, LLC

(57) ABSTRACT

An electrooptic device includes a first substrate, a second substrate which is arranged so as to be opposed to the first substrate, a plurality of pixel electrodes which are provided between the first substrate and the second substrate, a dielectric multilayer film which is formed so as to cover the plurality of pixel electrodes and in which a plurality of dielectric layers are laminated, and a sealing member which is arranged around a pixel region on which the plurality of pixel electrodes are provided and bonds the first substrate and the second substrate to each other. In the electrooptic device, at least one dielectric layer of the plurality of dielectric layers is formed so as not to overlap with a sealing region on the first substrate, on which the sealing member is arranged.

5 Claims, 3 Drawing Sheets

ELECTROOPTIC DEVICE AND ELECTRONIC APPARATUS

Japanese Patent Application No. 2010-085844, filed Apr. 2, 2010 is incorporated by reference in its entirety herein.

BACKGROUND

1. Technical Field

The present invention relates to an electrooptic device such as a liquid crystal device, for example, and an electronic apparatus including the electrooptic device, such as a liquid crystal projector, for example.

2. Related Art

In a liquid crystal device as an example of an electrooptic device of this type, for example, a pair of substrates is bonded to each other with a sealing member such as an ultraviolet curable resin, for example, on a sealing region through a predetermined space. Further, liquid crystal is sealed between the substrates. Pixel electrodes are arranged on a display region on one substrate in a matrix form, for example. A counter electrode made of a transparent conductive film is provided so as to be opposed to the pixel electrodes on the other substrate. A voltage based on an image signal is applied to a liquid crystal layer between the pixel electrodes and the counter electrode so that the orientation state of liquid crystal molecules is changed. If the orientation state of the liquid crystal molecules is changed in such a manner, light transmittance of each pixel is changed. Therefore, light transmitted through the liquid crystal layer is changed in accordance with the image signal so that display is realized on the display region.

For example, in JP-A-2010-20209, a technique for ensuring a light amount for curing a sealing member by forming light transmittance holes in a mesh pattern on a common wiring is disclosed.

Further, in a reflection-type liquid crystal device, a technique for forming a dielectric multilayer film on pixel electrodes in order to improve reflectance of the pixel electrodes has been known (for example, see JP-A-11-344726 and JP-A-2008-158395).

However, when the above dielectric multilayer film is also formed on a sealing region, there arises the following risk. That is, there arises a risk that a part of light is reflected by the dielectric multilayer film when a sealing member made of a photocurable adhesive material such as an ultraviolet curable resin, for example, is cured by irradiating the sealing member with light such as ultraviolet rays, for example, from the side of one substrate in a manufacturing process. Therefore, a technical problem that there is a risk that a part of the sealing member is not sufficiently irradiated with light and the part of the sealing member is not sufficiently cured and is left as an uncured part is caused. This also causes a risk that the uncured part of the sealing member enters a display region to bring about display failure. Accordingly, a technical problem of deterioration in reliability of the device is also caused.

SUMMARY

An advantage of some aspects of the invention is to provide an electrooptic device having high reliability, which can reduce an uncured part on a sealing member and realize display with high definition, and an electronic apparatus including the electrooptic device.

An electrooptic device according to an aspect of the invention includes a first substrate, a second substrate which is arranged so as to be opposed to the first substrate, a plurality of pixel electrodes which are provided between the first substrate and the second substrate, a dielectric multilayer film which is formed so as to cover the plurality of pixel electrodes and in which a plurality of dielectric layers are laminated, and a sealing member which is arranged around a pixel region on which the plurality of pixel electrodes are provided and bonds the first substrate and the second substrate to each other. In the electrooptic device, at least one dielectric layer of the plurality of dielectric layers is formed so as not to overlap with a sealing region on the first substrate, on which the sealing member is arranged.

With the electrooptic device according to the aspect of the invention, the first substrate and the second substrate are bonded to each other with the sealing member made of a photocurable adhesive material such as an ultraviolet curable resin, for example, on the sealing region along a periphery of the pixel region. An electrooptic material such as a liquid crystal, for example, is sandwiched between the first substrate and the second substrate. The first substrate has a laminate structure in which, for example, pixel switching transistors and wirings such as scanning lines and data lines are laminated on a glass substrate, for example. An interlayer insulating film formed with a silicon oxide film, for example, is formed on an uppermost layer thereof. The second substrate is formed with a glass substrate, for example. The pixel electrodes made of a conductive material such as an aluminum film, for example, are arranged on the first substrate in a matrix form. A counter electrode made of a transparent conductive material such as an Indium Tin Oxide (ITO) film, for example, is provided on the second substrate so as to be opposed to the pixel electrodes. When the electrooptic device is operated, a voltage based on an image signal is applied to the electrooptic material between the pixel electrodes and the counter electrode so that the orientation state of the electrooptic material is changed. If the orientation state of the electrooptic material is changed in such a manner, light transmittance of each pixel is changed. Therefore, light transmitted through the electrooptic material is changed in accordance with the image signal so that display is realized on the pixel region.

In the aspect of the invention, the dielectric multilayer film is formed so as to cover the plurality of pixel electrodes. Accordingly, reflectance of the pixel electrodes can be improved by the dielectric multilayer film.

Particularly in the aspect of the invention, at least one dielectric layer of the plurality of dielectric layers constituting the dielectric multilayer film is formed so as not to overlap with the sealing region on the first substrate. That is, at least one dielectric layer of the plurality of dielectric layers is formed so as to cover the plurality of pixel electrodes and so as not to overlap with the sealing region. In other words, at least one dielectric layer of the plurality of dielectric layers is formed on the pixel region so as to cover the plurality of pixel electrodes and is not formed on the sealing region.

With this configuration, a risk that a part of the sealing member is not sufficiently cured and is left due to the dielectric multilayer film in the manufacturing process can be reduced. To be more specific, when the sealing member made of the photocurable adhesive material is cured by irradiating the sealing member with light from the side of the first substrate in the manufacturing process, the following risk can be reduced. That is, a risk that a part of light is reflected by the dielectric multilayer film and light is not sufficiently irradiated onto a part of the sealing member so that the part of the sealing member is not sufficiently cured and left as an uncured part can be reduced. As a result, a problem that the uncured part of the sealing member enters the pixel region to cause display failure can be prevented from occurring. Accordingly, reliability of the device can be improved.

As described above, with the electrooptic device according to the aspect of the invention, for example, the uncured part on the sealing member can be reduced, display with high definition can be realized, and reliability of the device can also be improved.

In the electrooptic device according to another aspect of the invention, it is preferable that the electrooptic device include a counter electrode which is provided on the second substrate so as to be opposed to the plurality of pixel electrodes, and a second substrate-side dielectric layer which is formed so as to cover the counter electrode and so as not to overlap with the sealing region.

With the aspect of the invention, when the sealing member made of the photocurable adhesive material is cured by irradiating the sealing member with light from the side of the second substrate in the manufacturing process, the following risk can be reduced. That is, a risk that a part of light is reflected by the second substrate-side dielectric layer and light is not sufficiently irradiated onto a part of the sealing member so that the part of the sealing member is not sufficiently cured and left as an uncured part can be reduced.

In the electrooptic device according to more another aspect of the invention, it is preferable that all of the plurality of dielectric layers be formed so as not to overlap with the sealing region.

With the aspect of the invention, a risk that a part of the sealing member is not sufficiently cured and is left in the manufacturing process can be reduced more reliably.

An electronic apparatus according to still another aspect of the invention includes the above electrooptic device (including various aspects of the invention) in order to solve the above problem.

The electronic apparatus according to the aspect of the invention includes the above electrooptic device according to the aspects of the invention. Therefore, various types of electronic apparatuses which can realize display with high definition, such as a projection-type display device, a television, a mobile phone, an electronic organizer, a word processor, a view finder-type and a direct monitoring-type video recorder, a workstation, a videophone, a POS terminal, a touch panel, and the like, can be realized.

Effects and other advantages of the aspects of the invention will be made obvious from modes for carrying out the aspects of the invention which will be described later.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. In the following embodiments, a Thin Film Transistor (TFT) active matrix driving-type liquid crystal device is described as an example. The TFT active matrix driving-type liquid crystal device is an example of an electrooptic device according to the invention.

First Embodiment

A liquid crystal device according to the first embodiment is described with reference to FIG. 1 and FIG. 2.

At first, an entire configuration of the liquid crystal device according to the first embodiment is described with reference to FIG. 1 and FIG. 2.

Figure 1:
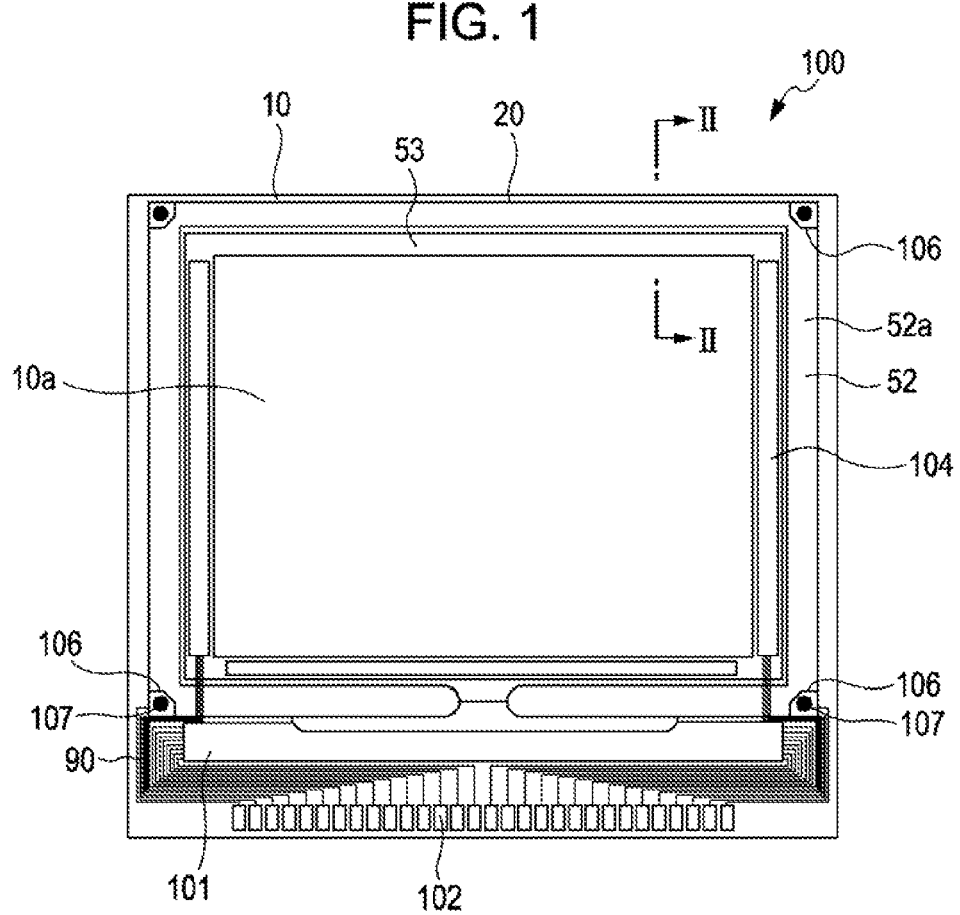
FIG. 1 is a plan view illustrating a configuration of a liquid crystal device according to a first embodiment.

FIG. 1 is a plan view illustrating a configuration of the liquid crystal device according to the embodiment. FIG. 2 is a cross-sectional view cut along a line II-II in FIG. 1.

Figure 2:
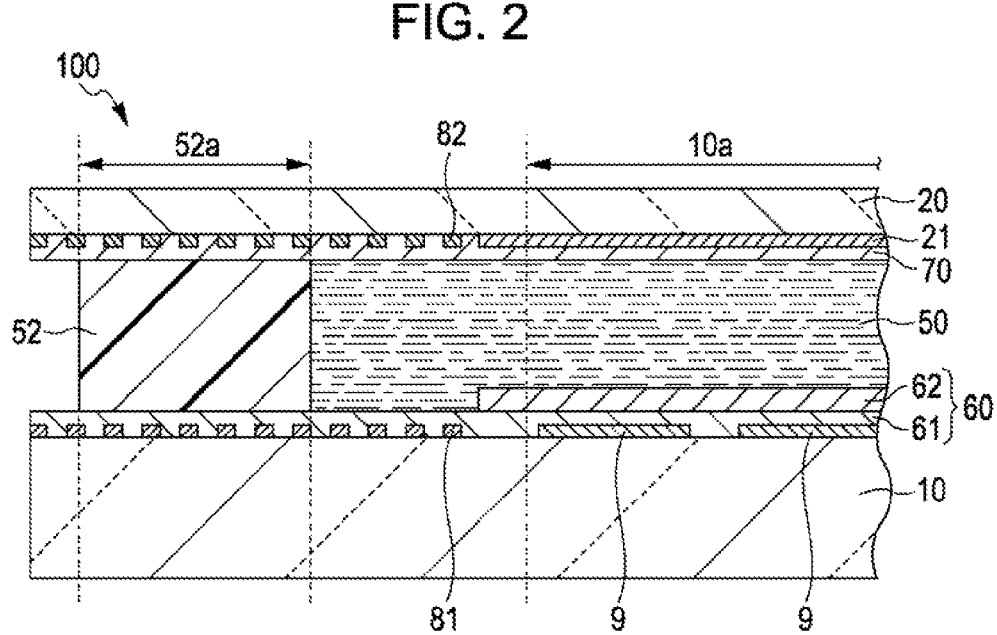
FIG. 2 is a cross-sectional view cut along a line II-II in FIG. 1.

In FIG. 1 and FIG. 2, in a liquid crystal device 100 according to the embodiment, an element substrate 10 as an example of a "first substrate" according to the invention and a counter substrate 20 as an example of a "second substrate" according to the invention are arranged so as to be opposed to each other. The element substrate 10 has a laminate structure in which, for example, pixel switching transistors and wirings such as scanning lines and data lines are laminated on a glass substrate, for example. An interlayer insulating film formed with a silicon oxide film, for example, is formed on an uppermost layer thereof. The counter substrate 20 is formed with a transparent substrate such as a glass substrate, for example. A liquid crystal layer 50 is sealed between the element substrate 10 and the counter substrate 20. Further, the element substrate 10 and the counter substrate 20 are bonded to each other with a sealing member 52. The sealing member 52 is provided on a sealing region 52a around an image display region 10a as an example of a "pixel region" according to the invention. The sealing member 52 is made of a photocurable adhesive material such as an ultraviolet curable resin, for example, for bonding both of the substrates to each other. In a manufacturing process, the sealing member 52 is coated on the element substrate 10, and then, is cured by light irradiation such as ultraviolet irradiation.

In FIG. 1, a frame light shielding film 53 having light shielding property is provided at the side of the counter substrate 20. The frame light shielding film 53 defines a frame region of the image display region 10a. The frame light shielding film 53 is provided in parallel with an inner side of the sealing region on which the sealing member 52 is arranged. A data line driving circuit 101 and external circuit connecting terminals 102 are provided on a peripheral region along one side of the element substrate 10. To be more specific, the data line driving circuit 101 and the external circuit connecting terminals 102 are provided on a region at an outer side of the sealing region on which the sealing member 52 is arranged. Further, scanning line driving circuits 104 are provided at an inner side of the sealing region along two sides each of which is adjacent to the one side so as to be covered by the frame light shielding film 53. Further, upper and lower conductive terminals 106 are arranged on the element substrate 10 at regions opposed to four corner portions of the counter substrate 20. The upper and lower conductive terminals 106 connect the element substrate 10 and the counter substrate 20 with upper and lower conductive members 107. An electric conduction between the element substrate 10 and the counter substrate 20 is achieved with the upper and lower conductive terminals 106 and the upper and lower conductive members 107.

A distributing wiring pattern 90 is formed on the element substrate 10. The distributing wiring pattern 90 electrically connects the external circuit connecting terminals 102, the data line driving circuit 101, the scanning line driving circuits 104, the upper and lower conductive terminals 106, and the like.

In FIG. 2, a laminate structure in which pixel switching TFTs and wirings such as scanning lines and data lines are mounted is formed on the element substrate 10. Reflection-type pixel electrodes 9 which reflect incident light are provided on the image display region 10a in a matrix form. The pixel electrodes 9 are provided at an upper layer side of the pixel switching TFTs and the wirings such as the scanning lines and the data lines. Further, a dielectric multilayer film 60 in which a dielectric layer 61 and a dielectric layer 62 are laminated is formed on the element substrate 10 so as to cover the plurality of pixel electrodes 9. Reflectance of the pixel electrodes 9 can be improved by the dielectric multilayer film 60. An orientation film is formed on the dielectric multilayer film 60. Further, a plurality of peripheral conductive films 81 are provided on a peripheral region around the image display region 10a on the element substrate 10. The plurality of peripheral conductive films 81 are formed by patterning the same conductive material as the pixel electrodes 9 at the same time as the pixel electrodes 9. Unevenness generated due to thicknesses of the pixel electrodes 9 on the surface of the laminate structure on the element substrate 10 can be reduced by the peripheral conductive films 81.

On the other hand, a counter electrode 21 is formed on a surface of the counter substrate 20, which is opposed to the element substrate 10. At this time, the counter electrode 21 is formed so as to be opposed to the plurality of pixel electrodes 9. The counter electrode 21 is made of a transparent conductive material such as ITO. A dielectric layer 70 is formed on the counter substrate 20 so as to cover the counter electrode 21. An orientation film is formed on the dielectric layer 70. Further, a plurality of peripheral conductive films 82 are provided on a peripheral region on the counter substrate 20. The plurality of peripheral conductive films 82 are formed by patterning the same conductive material as the counter electrode 21 at the same time as the patterning of the counter electrode 21. Unevenness generated due to the thickness of the counter electrode 21 on the surface of the laminate structure on the counter substrate 20 can be reduced by the peripheral conductive films 82.

Further, the liquid crystal layer 50 is made of a liquid crystal of one type of a nematic liquid crystal or a liquid crystal in which several types of nematic liquid crystals are mixed. The liquid crystal layer 50 is made into a predetermined orientation state between a pair of the orientation films.

It is to be noted that in the embodiment, incident light which is incident onto the image display region 10a from the side of the counter substrate 20 is reflected by the reflection-type pixel electrodes 9 so as to be output from the side of the counter substrate 20 as display light.

Next, a dielectric multilayer film of the liquid crystal device according to the embodiment is described with reference to FIG. 2.

As illustrated in FIG. 2, particularly in the embodiment, the dielectric layer 62 of two of the dielectric layer 61 and the dielectric layer 62 which constitute the dielectric multilayer film 60 is formed so as not to overlap with the sealing region 52a on the element substrate 10. That is, the dielectric layer 62 which constitutes a part of the dielectric multilayer film 60 is patterned so as to cover the plurality of pixel electrodes 9 and so as not to overlap with the sealing region 52a. In other words, the dielectric layer 62 is formed on the image display region 10a so as to cover the plurality of pixel electrodes 9 and is not formed on the sealing region 52a.

Therefore, a risk that a part of the sealing member 52 is not sufficiently cured and left due to the dielectric multilayer film 60 constituted by the dielectric layer 61 and the dielectric layer 62 in the manufacturing process can be reduced. To be more specific, when the sealing member 52 made of the photocurable adhesive material is cured by irradiating the sealing member 52 with light from the side of the element substrate 10 in the manufacturing process, the following risk can be reduced. That is, a risk that a part of light is reflected by the dielectric multilayer film 60 (to be more specific, the dielectric layer 62) and light is not sufficiently irradiated onto a part of the sealing member 52 so that the part of the sealing member 52 is not sufficiently cured and is left as an uncured part can be reduced. As a result, a problem that the uncured part of the sealing member 52 enters the image display region 10a to cause a display failure can be prevented from occurring. Accordingly, reliability (for example, light resistance, moisture resistance, and the like) of the device can be improved.

As described above, with the liquid crystal device according to the embodiment, for example, an uncured part on the sealing member 52 can be reduced, display with high definition can be realized, and reliability of the device can be improved.

Second Embodiment

Next, a liquid crystal device according to the second embodiment is described with reference to FIG. 3.

Figure 3:
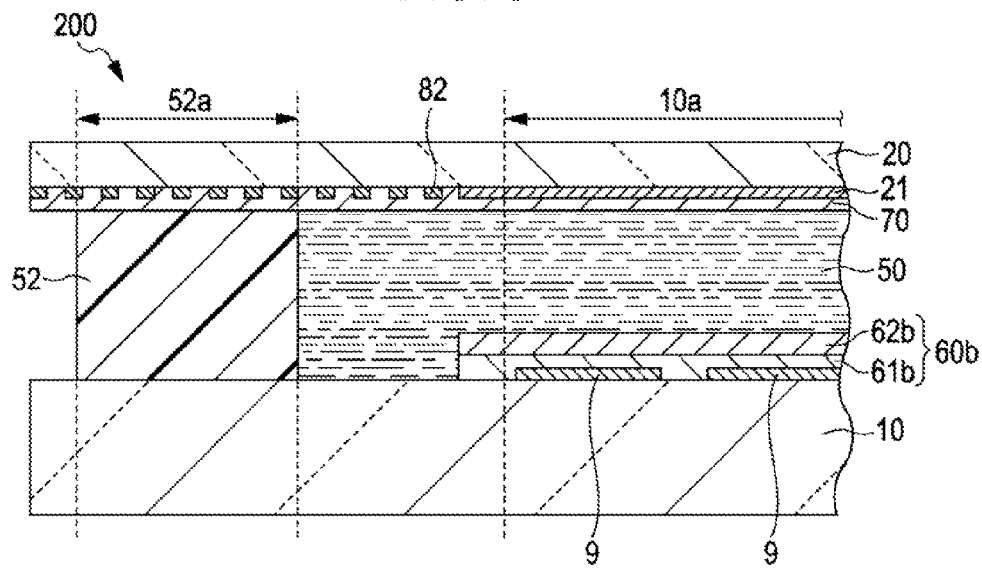
FIG. 3 is a cross-sectional view illustrating a configuration of a liquid crystal device according to a second embodiment.

FIG. 3 is a cross-sectional view illustrating a configuration of the liquid crystal device according to the second embodiment and is a view illustrating the same state as in FIG. 2. In FIG. 3, the same reference numerals denote the same constituent components as those according to the first embodiment as illustrated in FIG. 1 and FIG. 2 and description thereof is appropriately not repeated.

In FIG. 3, a liquid crystal device 200 according to the second embodiment is different from the liquid crystal device 100 according to the above first embodiment in the following points. That is, the liquid crystal device 200 according to the second embodiment includes a dielectric multilayer film 60b in place of the dielectric multilayer film 60 in the above first embodiment. Further, the liquid crystal device 200 according to the second embodiment does not include the peripheral conductive films 81 in the above first embodiment. Other points are substantially the same as the liquid crystal device 100 according to the above first embodiment.

In FIG. 3, the dielectric multilayer film 60b in which a dielectric layer 61b and a dielectric layer 62b are laminated is formed on the element substrate 10 so as to cover the plurality of pixel electrodes 9. Reflectance of the pixel electrodes 9 can be improved by the dielectric multilayer film 60b.

Particularly in the embodiment, both of two of the dielectric layer 61b and the dielectric layer 62b which constitute the dielectric multilayer film 60b are formed so as not to overlap with the sealing region 52a on the element substrate 10. That is, the dielectric multilayer film 60b is patterned so as to cover the plurality of pixel electrodes 9 and so as not to overlap with the sealing region 52a. In other words, the dielectric multilayer film 60b is formed on the image display region 10a so as to cover the plurality of pixel electrodes 9 and is not formed on the sealing region 52a.

Therefore, a risk that a part of the sealing member 52 is not sufficiently cured and left due to the dielectric multilayer film 60b constituted by the dielectric layer 61b and the dielectric layer 62b in the manufacturing process can be reduced more reliably in comparison with the above first embodiment. To be more specific, when the sealing member 52 made of the photocurable adhesive material is cured by irradiating the sealing member 52 with light from the side of the element substrate 10 in the manufacturing process, the following risk can be reduced. That is, a risk that a part of light is reflected by the dielectric multilayer film 60b and light is not sufficiently irradiated onto a part of the sealing member 52 so that the part of the sealing member 52 is not sufficiently cured and is left as an uncured part can be reduced more reliably in comparison with the above first embodiment.

Further, in the embodiment, the peripheral conductive films 81 in the above first embodiment are not included. Therefore, when the sealing member 52 made of the photocurable adhesive material is cured by irradiating the sealing member 52 with light from the side of the element substrate 10 in the manufacturing process, a problem that the part of the sealing member 52 is not sufficiently cured and left due to the peripheral conductive films 81 can be prevented from occurring.

Third Embodiment

A liquid crystal device according to the third embodiment is described with reference to FIG. 4.

Figure 4:
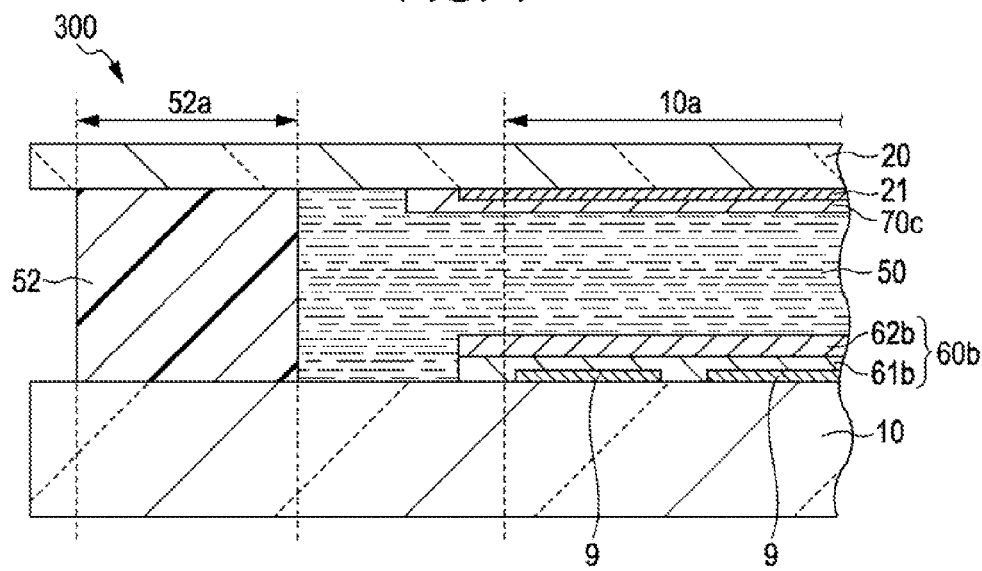
FIG. 4 is a cross-sectional view illustrating a configuration of a liquid crystal device according to a third embodiment.

FIG. 4 is a cross-sectional view illustrating a configuration of the liquid crystal device according to the third embodiment and is a view illustrating the same state as in FIG. 3. It is to be noted that in FIG. 4, the same reference numerals denote the same constituent components as those according to the second embodiment as illustrated in FIG. 3 and description thereof is appropriately not repeated.

In FIG. 4, a liquid crystal device 300 according to the third embodiment is different from the liquid crystal device 200 according to the above second embodiment in the following points. That is, the liquid crystal device 300 according to the third embodiment includes a dielectric layer 70c in place of the dielectric layer 70 in the above second embodiment. Further, the liquid crystal device 300 according to the third embodiment does not include the peripheral conductive films 82 in the above second embodiment. Other points are substantially the same as the liquid crystal device 200 according to the above second embodiment.

In FIG. 4, the dielectric layer 70c as an example of a "second substrate-side dielectric layer" according to the invention is formed on the counter substrate 20 so as to cover the counter electrode 21.

Particularly in the embodiment, the dielectric layer 70c is formed so as not to overlap with the sealing region 52a on the counter substrate 20. Therefore, when the sealing member 52 made of a photocurable adhesive material is cured by irradiating the sealing member 52 with light from the side of the counter substrate 20 in the manufacturing process, the following risk can be avoided. That is, a risk that a part of light is reflected by the dielectric layer 70c and light is not sufficiently irradiated onto a part of the sealing member 52 so that the part of the sealing member 52 is not sufficiently cured and left as an uncured part can be avoided.

Further, in the embodiment, the peripheral conductive films 82 in the above second embodiment are not included. Therefore, when the sealing member 52 made of the photocurable adhesive material is cured by irradiating the sealing member 52 with light from the side of the counter substrate 20 in the manufacturing process, a problem that the part of the sealing member 52 is not sufficiently cured and left due to the peripheral conductive films 82 can be prevented from occurring.

Electronic Apparatus

Next, a case where the above-described reflection-type liquid crystal device which is an electrooptic device is applied to an electronic apparatus is described. A projection-type liquid crystal projector is described as an example of the electronic apparatus according to the invention.

Figure 5:
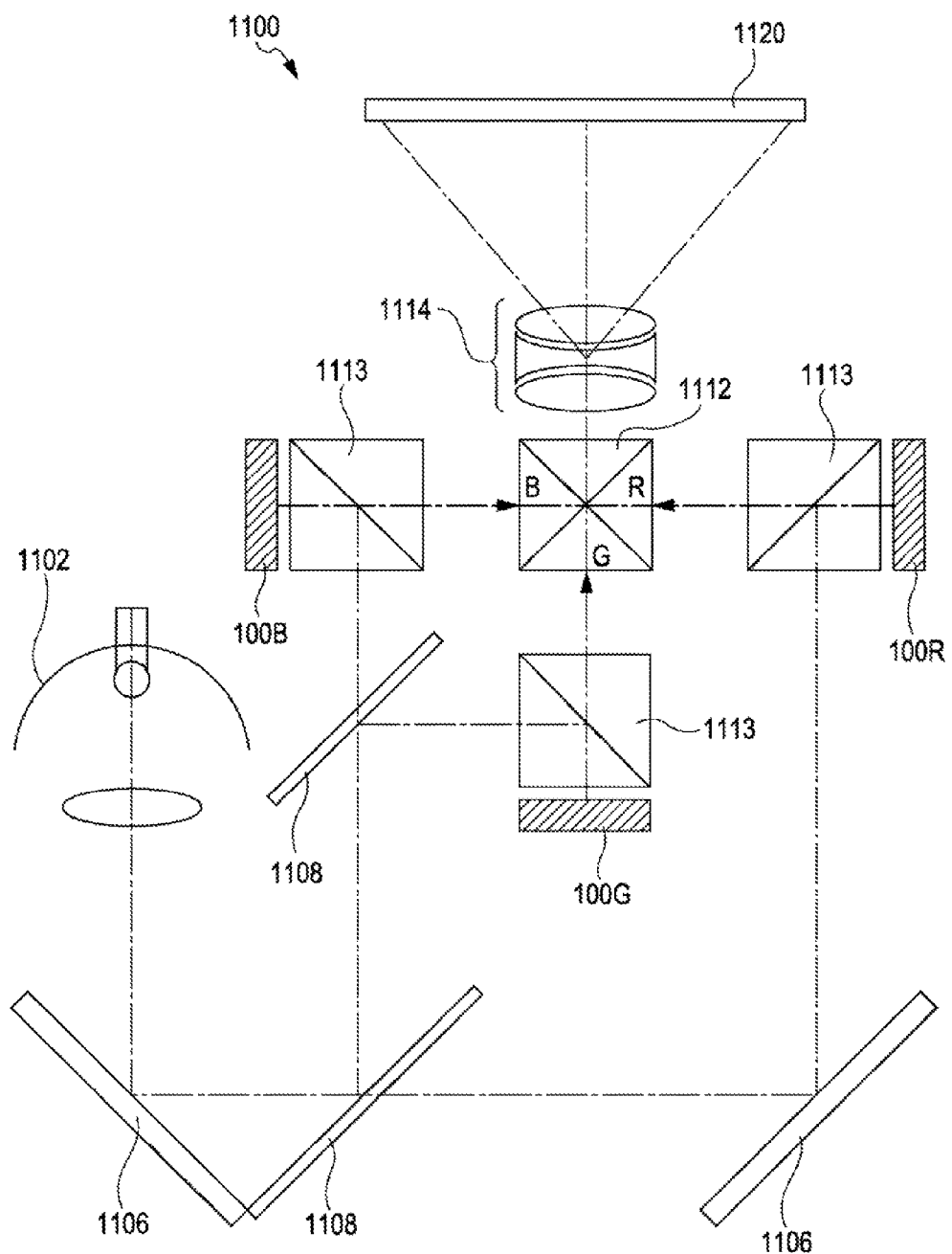
FIG. 5 is a schematic cross-sectional view illustrating a liquid crystal projector as an example of an electronic apparatus to which an electrooptic device is applied.

FIG. 5 is a schematic cross-sectional view illustrating a projection-type liquid crystal projector according to the embodiment.

In FIG. 5, a liquid crystal projector 1100 is configured as a multiple-plate type color projector using three liquid crystal light bulbs 100R, 100G, and 100B for RGB, respectively. As each of the liquid crystal light bulbs 100R, 100G and 100B, the above reflection-type liquid crystal device is used.

As illustrated in FIG. 5, in the liquid crystal projector 1100, when projection light is emitted from a lamp unit 1102 as a white light source, such as a metal halide lamp, the projection light is divided into optical elements R, G and B corresponding to three primary colors of RGB by two mirrors 1106, two dichroic mirrors 1108 and three polarization beam splitters (PBSs) 1113. Then, the divided optical elements are guided to the liquid crystal light bulbs 100R, 100G, and 100B corresponding to each color, respectively. In this case, a lens may be appropriately provided on the middle of an optical path in order to prevent a light loss on the optical path. Further, the optical elements corresponding to three primary colors, which have been modulated by the liquid crystal light bulbs 100R, 100G, and 100B, respectively, are synthesized by a cross prism 1112, and then, projected onto a screen 1120 through a projection lens 1114 as a color image.

It is to be noted that since light corresponding to each primary color of R, G and B is incident onto each of the liquid crystal panels 100R, 100B and 100G by the dichroic mirrors 1108 and the polarization beam splitters 1113, a color filter is not required to be provided.

In addition to the electronic apparatus which has been described with reference to FIG. 5, electronic apparatuses including a mobile personal computer, a mobile phone, a liquid crystal television, a view finder-type or a direct monitoring-type video recorder, a car navigation system, a pager, an electronic organizer, a calculator, a word processor, a workstation, a videophone, a POS terminal, a device including a touch panel, and the like are exemplified. It is needless to say that the invention can be applied to these various types of electronic apparatuses.

Further, the invention can be applied to a plasma display (PDP), a field emission display (FED, SED), an organic EL display, a digital micro mirror device (DMD), an electrophoresis apparatus, and the like in addition to the liquid crystal device described in the above embodiments.

The invention is not limited to the above embodiments and can be appropriately changed in a range without departing from the scope and spirit of the invention read from aspects of the invention and the entire specification. Further, electrooptic devices including such change and electronic apparatuses including the electrooptic devices are also encompassed within the technical range of the invention.

What is claimed is:
1. An electrooptic device comprising:
a first substrate;
a second substrate which is arranged so as to be opposed to the first substrate;
a plurality of pixel electrodes which are provided between the first substrate and the second substrate;

a dielectric multilayer film which is formed so as to cover the plurality of pixel electrodes and in which a plurality of dielectric layers are laminated; and a sealing member which is arranged around a pixel region on which the plurality of pixel electrodes are provided and bonds the first substrate and the second substrate to each other, wherein:

at least one dielectric layer of the plurality of dielectric layers is formed so as not to overlap with the sealing member when seen from above, each of the plurality of pixel electrodes are reflective, and at least one dielectric layer of the plurality of dielectric layers improves reflectance of the plurality of pixel electrodes.

2. The electrooptic device according to claim 1, comprising:

a counter electrode which is provided on the second substrate so as to be opposed to the plurality of pixel electrodes; and a second substrate-side dielectric layer which is formed so as to cover the counter electrode and so as not to overlap with the sealing member when seen from above.

3. The electrooptic device according to claim 1, wherein all of the plurality of dielectric layers are formed so as not to overlap with the sealing member when seen from above.

4. An electronic apparatus comprising the electrooptic device according to claim 1.

5. The electrooptic device according to claim 1, further comprising a plurality of peripheral conductive films that are disposed outside of the pixel region.

* * * * *